July 18, 1967  H. G. GLENN  3,331,271
MUSICAL NOTATION
Filed June 15, 1964
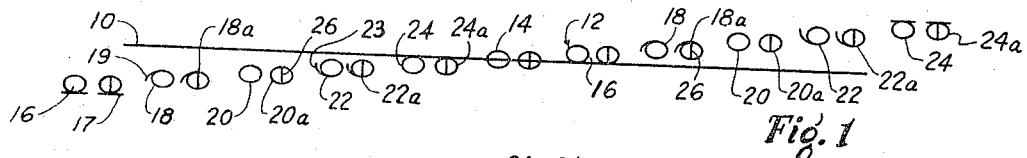
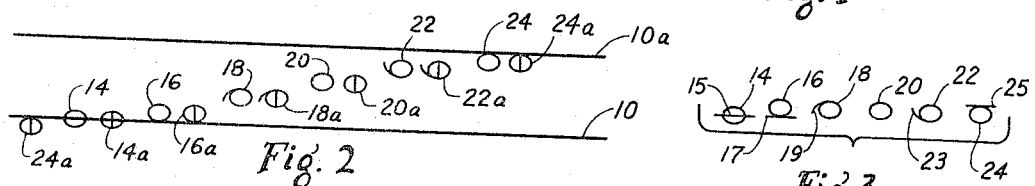
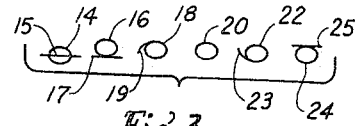
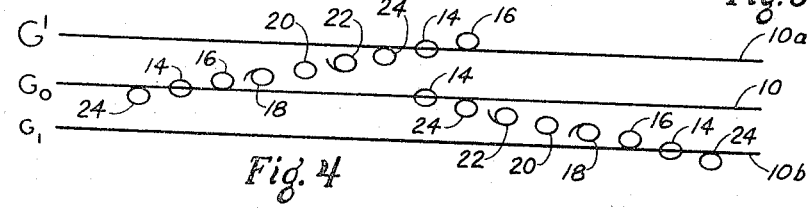
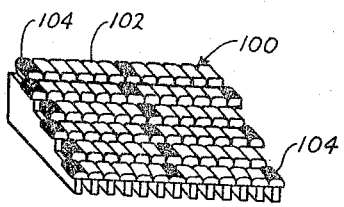
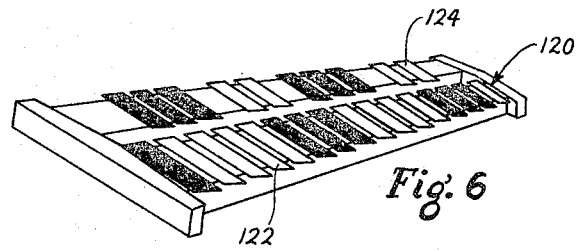
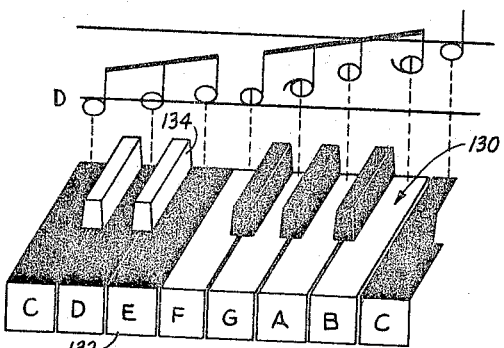
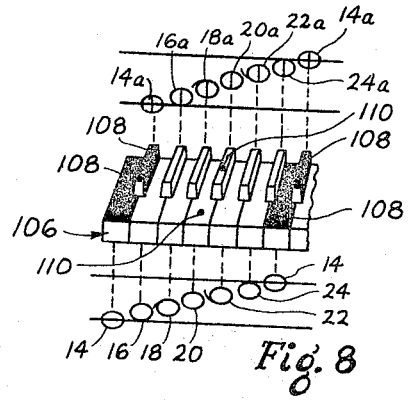
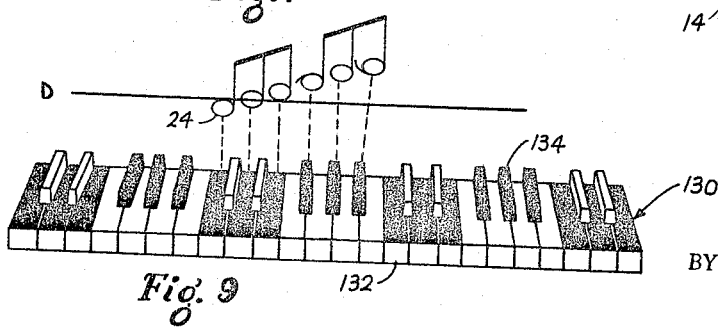
Helen Gregg Glenn
INVENTOR.
BY Mildred K. Flowers
AGENT

United States Patent Office 3,331,271
Patented July 18, 1967

3,331,271
MUSICAL NOTATION
Helen Gregg Glenn, 840 Cantwell,
Stillwater, Okla. 74074
Filed June 15, 1964, Ser. No. 375,002
2 Claims. (Cl. 84—478)

This invention relates to improvements in the writing of music and in the marking of the finger keys on keyboard instruments for facilitating the writing, teaching, learning and reading of music.

The most common musical notation system in use today comprises a five-lined staff with each line and each space of the staff designating a particular musical note or tone. Music written for pianos, and many other instruments, commonly utilize two spaced five-lined staffs with the upper staff normally being the treble staff and the lower staff being the bass staff. In this instance, the lines and spaces of one staff represent certain musical notes and the lines and spaces of the second staff represent other musical notes, but the notes on the two staffs are not the same for the respective position of the lines and spaces thereof. For example, the five lines of the upper or treble staff represent the musical notes indicated by the letters E, G, B, D, and F, in sequence from the lowermost line to the uppermost line, whereas the five lines of the lower or bass staff represent the letters G, B, D, F, and A. Thus, the student must learn two completely different staff positions for the musical notes. In addition, in the present-day notation system there are no assumed staff lines, and if a note is written beyond the actual staff, the staff line corresponding to the note must be added as a ledger line, which is a short staff line extending horizontally through the note. Of course, each staff line between the note positioned beyond the staff and staff itself must also be added, and it will be apparent that it is frequently necessary to add several ledger lines to ascertain the identity of a note. In order to indicate tone changes for half-tones, a system of designations or characters, known as sharps and flats, are utilized wherein the sharps indicate the note is to be raised a half-tone and the flats indicate the note is to be lowered a half-tone.

In addition, the most conventional way in use today for marking both the unsymmetrical 5/7 keyboard and the symmetrical 6/6 keyboard is to make all the finger-keys belonging to the key of C-major of white color, that is pitches A, B, C, D, E, F, and G, and to make all the remaining finger-keys of a black color, thereby correlating both the keyboards with conventional notation.

The present invention contemplates a novel musical notation system wherein a single written line in combination with two assumed lines may be utilized for each octave in lieu of the usual five-line staff in the present day notation system. The music notes are disposed in positions relative to the line in such a manner that a musical scale may be written substantially identically the same regardless of the musical key in which the composition is written. As a result, there is much less effort required in the learning of material for the musical student and transposing from one key to another is greatly facilitated.

The invention also teaches a new or additional marking of the finger-keys for both the unsymmetrical 5/7 keyboard and the symmetrical 6/6 keyboard which correlates with the novel notation system. That is, the novel-marked keyboards have the same advantages for teaching interval and key relationships as the novel notation system; consequently, the novel marked keyboards correlate best with the novel notation but can also be beneficial for teaching and learning music by ear or via conventional notation.

It is an important object of this invention to provide a novel musical notation system which greatly facilitates the teaching and reading of music.

It is another object of this invention to provide novel marked keyboards which greatly facilitate the teaching of music.

A further object of this invention is to provide an improved musical notation system wherein the music may be written in an identical manner regardless of the musical key of the composition.

It is a still further object of this invention to provide a novel musical notation system which may be readily utilized with a symmetric piano keyboard as well as with the standard keyboard in widespread use today.

Still another object of this invention is to provide a novel musical notation system wherein the writing of the braille counterpart is greatly simplified.

A still further object of this invention is to provide a novel musical notation system wherein both the oriental and occidental music may be represented by the same notation method.

A still further object of this invention is to provide a novel musical notation system which is simple and efficient in utilization.

Other and further objects and advantageous features of the present invention will hereinafter more fully appear in connection with a detailed description of the drawings in which:

FIGURE 1 is a plan view of a staff of the invention with a chromatic succession of notes indicated thereon.

FIGURE 2 is a plan view of a staff embodying the invention showing two octave lines with a chromatic scale illustrated thereon.

FIGURE 3 is a view of the basic configuration for notes of the invention.

FIGURE 4 is a plan view of a musical notation embodying the present invention and illustrating a plurality of octaves.

FIGURE 5 is a perspective view of a symmetrical keyboard known as a Janko keyboard embodying the invention.

FIGURE 6 is a perspective view of an unsymmetrical xylophone type keyboard embodying the invention.

FIGURE 7 is a perspective view of an unsymmetrical keyboard of the piano type embodying the invention and depicting the notation system of the invention in combination therewith.

FIGURE 8 is a perspective view of a symmetrical keyboard embodying the invention and depicted in combination with the notation system of the invention.

FIGURE 9 is a view similar to FIGURE 8 but depicting an unsymmetrical keyboard.

Referring to the drawings in detail, and particularly FIGURES 1, 2, 3 and 4 the present invention contemplates the use of a single written line 10 extending substantially horizontally. An assumed line (not shown) exists on each side of the line 10 but need not be printed or written on the sheet music. The musical notation of the present invention comprises a plurality of basic notes as generally indicated at 12. The pitch of a note 12 is determined by both its external and internal appearance, as will be hereinafter set forth. The configuration of each note 12 is associated with the line 10 by the spacing therefrom or in relation thereto. Except for the presence or absence of an attached line, the notes 12 are preferably all of substantial identical configuration and, as depicted herein, are oval in shape; but it is to be understood there is no limitation to this particular configuration. Different shapes could be utilized to indicate a great number of variations of musical concepts. As shown in FIGURE 3, the basic configuration for the notes 12 depicted therein utilized in the invention comprise a plurality of positions for the notes wtih respect to the line 10 and each note 12 may be recognized by its particular contour. For example, a note 14 which is disposed directly on the line 10 and which will be referred to as the "line note" or octave reference note may be recognized by the horizontal line 15 extending substantially centrally therethrough. A note 16 which is disposed immediately above the line 10 and rests substantially thereon may be readily identified by the horizontal line 17 extending substantially tangent to the lowermost portion of the note 16. Of course, when this note is actually positioned above the line 10, the line 17 and the line 10 become synonymous as will be hereinafter set forth. A note 18 is disposed immediately above the note 16 and is on the assumed line above the line 10. The note 18 is provided with a downwardly extending finger 19 which indicates the position or direction of the nearest line 10 with respect to the note 18. A note 20 is disposed immediately above the note 18 and is spaced substantially centrally between the line 10 and the next similar line such as 10a (FIGURE 2) which indicates the next octave above the line 10. The note 20 will be referred to as the center note and as depicted herein is of a plain oval configuration. A note 22 disposed immediately above the center note 20 is provided with an upwardly extending finger 23 which indicates the direction of the next line 10a, most closely disposed with respect to the note 22. A note 24 disposed above the note 22 rests adjacent the octave line 10a and is identified by a relatively short horizontal line 25 which extends substantially tangent to the upper portion of the note 24. Of course, when the note 24 is written adjacent an actual line 10a, the lines 10a and 25 become synonymous as will be hereinafter set forth. The interval relationship between staff degrees, represented by the basic configuration of notes 12, is established in any tuning system by some suitably defined clef-nomenclature. Further graduation of pitch between staff degrees is indicated by suitable markings within any basic configuration. For example, in twelve-tone equal temperament intonation, a vertical line 26 may extend substantially through any of the basic configurations to indicate that the pitch thereof is to be raised by one-half step; therefore, there is a whole-step interval between adjacent notes 12 whose centers are identical. Since the tuning systems of oriental and occidental twelve-tone intonations are very similar, intermediate tones in both systems may be indicated by the vertical line 26.

Referring now to FIGURE 2, it may be desirable to use both the lines 10 and 10a wherein the line 10 denotes one octave and the line 10a denotes the next succeeding octave. The notes of the scale extending therebetween will be as hereinbefore set forth in FIGURE 1. Of course, if it is preferable to refer to the notes by the letter designations as is well known today instead of simply referring to the notes as the syllables of the scale, the line note 14 would be known by the name of the musical note to which the line 10 refers. For example, if the line 10 indicates the note F, then the line note 14 would indicate F on the musical arrangement. Note 14a would indicate F sharp; note 16 would indicate G; 16a would indicate G sharp; note 18 would indicate A with 18a indicating A sharp; note 20 will be B; 20a would indicate C (it being noted that there is only a one-half tone differential between the notes B and C). Note 22 would indicate C sharp; note 22a would indicate D; note 24 would indicate D sharp and note 24a would indicate E.

As shown in FIGURE 4, it may be desirable to indicate the octaves above and below line 10 in which event line 10a woud indicate an octave above line 10 and line 10b would indicate an octave below line 10. The ascending and descending notes would appear as hereinbefore set forth. In this instance, it may be preferable to indicate or designate each of the lines 10, 10a and 10b, preferably in the extreme left end of each staff line with both the pitch name and octaves which the respective line notes 14 indicate. For example, as shown herein, line 10 may be designated as $G_0$. This would indicate the pitch of the line note 14 to be the small octave G. The line 10a in this instance would be designated $G^1$, the position of the 1 being slightly raised with respect to the letter G to indicate that this is the first octave above the small octave. The line 10b would be designated $G_1$ which would indicate the first octave below the small octave. It will be readily apparent that substantially any number of octaves may be utilized and designated similarly with the exponent and subscript numbers ascending and descending in numerical order.

Whereas the notation system of the present invention may be utilized with the unsymmetrical conventional piano keyboards, and the like, in use today, the new system is of particular value in utilization with a symmetrical keyboard such as that commonly known as the Janko keyboard. The symmetrical keyboard comprises uniform spacing of the finger keys throughout the length of the keyboard. That is, the finger keys are arranged in whole step rows which renders along the music notation of the present invention particularly adaptable to this type keyboard.

When the notation system is to be used in conjunction with an unsymmetrical keyboard, it may be preferable to mark the finger keys to correlate with the notation. This may be accomplished by alternating two colors, such as black and white, on the faces of the finger keys so that there is a whole step interval between consecutive finger keys of like colors. For example, making the finger keys in the C whole step series black and the remaining keys white will make the least number of changes in key coloring in the present day keyboards. When the notation system is to be used with a symmetrical keyboard, it is desirable to mark or otherwise identify at least one line note finger key and similarly mark each octave with respect thereto. In other words, every seventh finger key in each row of keys should be suitably identified. In addition, it is preferable to provide a distinguishing mark on the finger key centrally disposed between the marked seventh keys of each system with the symmetrical keyboard.

Referring now to FIGURE 5, a symmetrical Janko-type keyboard generally indicated at 100 comprises a plurality of uniformly spaced finger keys 102 arranged in ascending rows with the first, third and fifth rows including the finger-keys belonging to the C whole-step series and the second, fourth and sixth rows including the finger-keys belonging to the C# whole-step series. In accordance with the present invention, as hereinbefore set forth, a reference finger-key and each octave finger-key related therewith are marked or otherwise colored or indicated as shown at 104. It will be readily apparent from an inspection of FIGURE 5 that the keyboard 100 will then be provided with five keys 102 interposed between two marked keys 104. The marking 104 identifies the beginning of a new octave in a row of uniformly spaced finger-keys.

As shown in FIGURE 8, a symmetrical piano-type keyboard generally indicated at 106 is depicted wherein twelve tones per octave are represented by uniformly spaced finger keys arranged in two rows with six finger keys per octave in each row and in each row of finger keys a first identifying marking as shown at 108 is provided for one finger key and each octave finger key related therewith, and a second identifying marking as shown at 110 is provided for the finger key centrally disposed between two finger keys having identifying markings 108. Such marking of the keyboard 106 identifies an octave pattern whereby each finger key thereon is either a marked finger key or disposed adjacent to a marked finger key. FIGURE 8 also illustrates a correlating notational octave pattern wherein each of the notes in the invention is either a line note (14, 14a) or center note (20, 20a) or disposed immediately above or below a line or center note.

The keyboard generally indicated at 130 in FIGURE 7 is also of the unsymmetrical type and is commonly used in the construction of pianos, and the like. The keyboard 130 comprises a plurality of keys 132 disposed side by side in a first row, and a plurality of off-set keys 134 disposed in a second row. One octave on the keyboard 130 extends between the finger keys of like name. For example, one octave, as shown herein, begins with the one or musical note C and continues through D, E, F, G, A, B, and ends with the next succeeding note C, as indicated on the face of the individual keys 132. In order to provide the keyboard 130 with the present invention, the keys C, D, and E of each octave may be colored black, or otherwise identically indicated, and the keys F, G, A, and B may be colored white, or otherwise identically marked so as to be distinguishable from the keys C, D, and E. In addition, each set of three closely associated keys 134 may be colored black, or marked similarly as the keys C, D, and E, and each set of two closely associated keys 134 may be colored white, or marked similarly as the keys F, G, A, and B. By so marking the keyboard 130, the finger keys which belong to the same whole-step series have an identifying feature in common; that is, the finger keys belonging to the C whole-step series are colored black and the finger keys belonging to the C# whole step series are colored white.

FIGURE 9 is a view of the keyboard 130 in greater length with several octaves shown, and illustrates how the musical notation system of the invention is correlated to the marked keyboard.

The xylophone type keyboard generally indicated at 120 in FIGURE 6 is of an unsymmetrical type and as shown herein comprises a plurality of finger keys 122 disposed in a first row and a plurality of off-set finger keys 124 disposed in a second row, as is well known in this type of keyboard structure. The identifying markings on the finger keys 122 and 124 as depicted in FIGURE 6 are substantially the same as the identifying markings on the finger keys 132 and 134 shown in FIGURES 7 and 9.

Both the symmetrical and unsymmetrical keyboards as shown in the drawings have two whole-step series of keys, commonly referred to as the C and C# series. The symmetric keyboard, such as the Janko keyboard shown in FIGURE 5 and the keyboard shown in FIGURE 8 distinguishes between the C and C# series by the arrangement of the keys. That is, all the keys belonging to the C series are in one row and all the keys belonging to the C# series are in a succeeding row. However, the conventional unsymmetrical keyboard in common use today does not distinguish between the two series of keys. An unsymmetrical keyboard embodying the present invention as shown in FIGURES 6, 7 and 9, distinguishes between the two whole-step series, and will have six white keys and six black keys per octave to correlate with the symmetrical keyboard's six raised and six lower keys per octave.

As hereinbefore set forth, on an unsymmetrical 5/7 keyboard provided with the identifying markings of the invention the keys which belong to the same whole-step series have an identifying feature in common. As shown in FIGURES 6, 7 and 9, for example, the keys belonging to the C whole-step series are colored black and the keys belonging to the C# whole-step series are colored white. Similarly, in the novel notation system, note symbols which represent the same whole-step series also have an identifying feature in common. By way of example, a vertical line, such as the line 26, through the center of each note in FIGURE 9 would raise the pitch of each note by one half step and these new notes would then represent the C# whole-step series instead of the C whole-step series.

Distinguishing between the two whole-step series on a keyboard as well as in the notation system is beneficial in determining interval relationships for many reasons. For instance, with a keyboard and notation as depicted in FIGURE 7, an interval of a major third on the keyboard would consist of two finger keys of like color and, in notation, two notes of like center, whereas an interval of a minor third would consist of two finger keys of opposing colors and, in notation, two notes of opposing centers.

Distinguishing between the two whole-step series is also beneficial in determining the position of a chord. As an example, each major or minor triad (a chord consisting of three keys, two of the keys belonging to the same whole-step series, and the third key of the chord belonging to the other whole-step series) has three possible positions on the keyboard and the position of a particular triad is shown by the position of the third or odd finger key. Similarly, the position of the triad is shown in the notation by the note having the odd note center. Distinguishing between the two whole-step series is also beneficial for forming a scale pattern. To illustrate, FIGURE 2 shows a notational pattern for a chromatic scale which consists of consecutive notes with alternating centers. Likewise to play a chromatic scale on a keyboard such as shown in FIGURES 6, 7 and 9, the performer would alternate black and white keys in consecutive order. To play a whole-step scale on such a keyboard, one would strike either all white keys or all black keys, the choice of color depending on whether scale degree #1 is a black or white key. Likewise a correlating notational pattern for a whole-step scale consists of notes with like centers, as shown in FIGURE 9.

Major and minor scales as well as all other types of scales follow a particular keyboard and notational pattern. Still referring to a novel marked keyboard such as pictured in FIGURES 6, 7 and 9 the seven different tones in the ascending scale of C-major are represented by the lower row of keys with a repetitive color pattern of three black keys followed by four white keys. The color pattern for any ascending major scale would be essentially the same; that is, three keys the color of the first or keynote followed by four keys of the opposing color. As also illustrated in FIGURE 7, a correlating notational pattern for the seven different tones in an ascending major scale consists of three notes whose centers are the same as the keynotes (scale degree #1) followed by four notes, each having the opposing center.

From the foregoing, it will be apparent that the present invention provides a novel musical notation system and keyboard which greatly expands the scope of writing and reading music. The novel notation system is of substantially universal utilization and is simple and efficient in both the writing and reading of music.

Changes may be made in the combination and arrangement of parts as heretofore set forth in the specification and shown in the drawings, it being understood that any modification in the precise embodiment of the invention may be made within the scope of the following claims, without departing from the spirit of the invention.

What is claimed is:

1. In combination with a twelve-tone per octave equal temperament tuning system, an article of manufacture comprising a conventional keyboard having finger-keys thereon, said finger-keys arranged unsymmetrically in alternate rows of seven and five finger-keys per octave, identifying means provided on the said finger-keys for differentiating between the set of finger-keys belonging to a C whole-step series and the set of finger-keys belonging to the C# whole-step series, said identifying means correlating the conventional unsymmetrical keyboard with a notation of pitch comprising six basic note configurations, each basic note configuration having one of two different centers, said notes having like centers and consecutively arranged according to ascending pitch representing pitch progression by whole-step intervals.

2. In combination with the twelve-tone per octave equal-temperament tuning system, an article of manufacture comprising a key-board having finger-keys thereon, said finger-keys arranged symmetrically in alternate rows with the finger-keys representing the tones in the C whole-step series arranged in one row and the finger-keys representing the C# whole step series in a succeeding row, and identifying marking provided on one reference finger-key in each row of finger-keys and each octave finger-key related therewith, said identifying markings correlating the symmetrical keyboard with a notation of pitch comprising a plurality of notes in combination with a staff, said staff having one reference line per octave and means for designating one staff degree per whole-step scale degree.

References Cited

UNITED STATES PATENTS

| | | | |
|---|---|---|---|
| 438,429 | 10/1890 | Clemens | 283—47 |
| 482,442 | 9/1892 | Robberson | 283—47 |
| 1,594,194 | 7/1926 | Burgess | 283—47 |

RICHARD B. WILKINSON, *Primary Examiner.*

LEO SMILOW, C. M. OVERBEY,
*Assistant Examiners.*